US012484855B2

(12) United States Patent
Roche

(10) Patent No.: US 12,484,855 B2
(45) Date of Patent: Dec. 2, 2025

(54) PRE-OPERATIVE, INTRA-OPERATIVE, AND POST-OPERATIVE PATIENT MANAGEMENT

(71) Applicant: Martin Roche, Fort Lauderdale, FL (US)

(72) Inventor: Martin Roche, Fort Lauderdale, FL (US)

( * ) Notice: Subject to any disclaimer, the term of this patent is extended or adjusted under 35 U.S.C. 154(b) by 703 days.

(21) Appl. No.: 17/646,585

(22) Filed: Dec. 30, 2021

(65) Prior Publication Data

US 2022/0202369 A1 Jun. 30, 2022

Related U.S. Application Data

(60) Provisional application No. 63/132,841, filed on Dec. 31, 2020.

(51) Int. Cl.
| | |
|---|---|
| *A61B 5/11* | (2006.01) |
| *A61B 5/00* | (2006.01) |
| *A61B 34/10* | (2016.01) |
| *A61B 34/30* | (2016.01) |
| *G16H 20/40* | (2018.01) |

(52) U.S. Cl.
CPC .............. *A61B 5/6878* (2013.01); *A61B 5/11* (2013.01); *A61B 5/45* (2013.01); *A61B 5/6812* (2013.01); *A61B 5/7465* (2013.01); *A61B 34/10* (2016.02); *A61B 34/30* (2016.02); *G16H 20/40* (2018.01); *A61B 2034/102* (2016.02); *A61B 2034/105* (2016.02); *A61B 2562/0219* (2013.01)

(58) Field of Classification Search
CPC ....... A61B 5/6878; A61B 34/10; A61B 34/20; A61B 5/11; A61B 5/45; A61B 5/6812; A61B 5/7465; A61B 2562/0219
See application file for complete search history.

(56) References Cited

U.S. PATENT DOCUMENTS

| | | | |
|---|---|---|---|
| 8,685,093 B2 * | 4/2014 | Anderson .............. | A61B 5/686 600/424 |
| 8,926,674 B2 * | 1/2015 | Wolter ................. | A61B 5/4504 600/587 |
| 2013/0211259 A1 | 8/2013 | Komistek et al. | |

(Continued)

*Primary Examiner* — Eric F Winakur
(74) *Attorney, Agent, or Firm* — Bookoff McAndrews, PLLC

(57) ABSTRACT

An end to end process is disclosed that includes an installation of a prosthetic component, a prosthetic joint, or repair a musculoskeletal system. The pathway of care comprises a pre-operative pathway of care, an intra-operative pathway of care, and a post-operative pathway of care. An application downloaded to a computer drives the process. The application can include integrated PROMS, pain scores, patient Q&A, surveys, a calendar of events (such as physical therapy visits), and contact to surgeon, doctor, or healthcare provider. The pathway of care is an end to end process utilizing wearable devices, implantable devices, sensorized equipment, and sensorized tools to generate measurement data that supports a pre-operative plan, surgery, and post-operative rehabilitation. The application couples to the devices disclosed herein above to engage the patient one or more tasks such that sensors on the devices generate measurement data. The process provides better patient care while allowing the surgeon, doctor, or healthcare provider to handle more patients.

20 Claims, 7 Drawing Sheets

(56) References Cited

U.S. PATENT DOCUMENTS

| | | |
|---|---|---|
| 2019/0038214 A1* | 2/2019 | Mikhail .............. A61B 5/6878 |
| 2020/0335222 A1 | 10/2020 | Winterbach et al. |
| 2020/0405219 A1 | 12/2020 | Trabish et al. |
| 2020/0405227 A1 | 12/2020 | Trabish et al. |
| 2021/0350897 A1 | 11/2021 | Shelton, IV et al. |

* cited by examiner

PRE-OPERATIVE, INTRA-OPERATIVE, AND POST-OPERATIVE PATIENT MANAGEMENT

FIELD

The present invention pertains generally to medical devices, and particularly to, but not exclusively to, a medical system for improving orthopedic implant surgery and post-operative rehabilitation.

BACKGROUND

The musculoskeletal system of a mammal is subject to variations among species. Further changes can occur due to environmental factors, degradation through use, and aging. A joint of the musculoskeletal system typically comprises two or more bones that move in relation to one another. Movement is enabled by muscle tissue and tendons that is a part of the musculoskeletal system. Ligaments can position, hold, and stabilize one or more bones of a joint. Cartilage is a wear surface that prevents bone-to-bone contact, distributes load, and lowers friction.

There has been substantial growth in the repair of the human musculoskeletal system. In general, prosthetic joints have evolved using information from simulations, mechanical prototypes, and patient data that is collected and used to initiate improved designs. Similarly, the tools being used for orthopedic surgery have been refined over the years but have not changed substantially. Thus, the basic procedure for correction of the musculoskeletal system has been standardized to meet the general needs of a wide distribution of the population. Although the tools, procedure, and artificial replacement systems meet a general need, each replacement procedure is subject to significant variation from patient to patient. The correction of these individual variations relies on the skill of the surgeon to adapt and fit the replacement joint using the available tools to the specific circumstance. It would be of great benefit if a system could be developed that improves surgical outcomes, reduces the cost and time of a surgery, and supports rehabilitation.

BRIEF DESCRIPTION OF THE DRAWINGS

Various features of the system are set forth with particularity in the appended claims. The embodiments herein, can be understood by reference to the following description, taken in conjunction with the accompanying drawings, in which:

FIG. ZB is an illustration of one or more implantable devices holding a ligament of a musculoskeletal system to a femur and a tibia of a leg in accordance with an example embodiment.

Figures 2A, 2B, 2C:
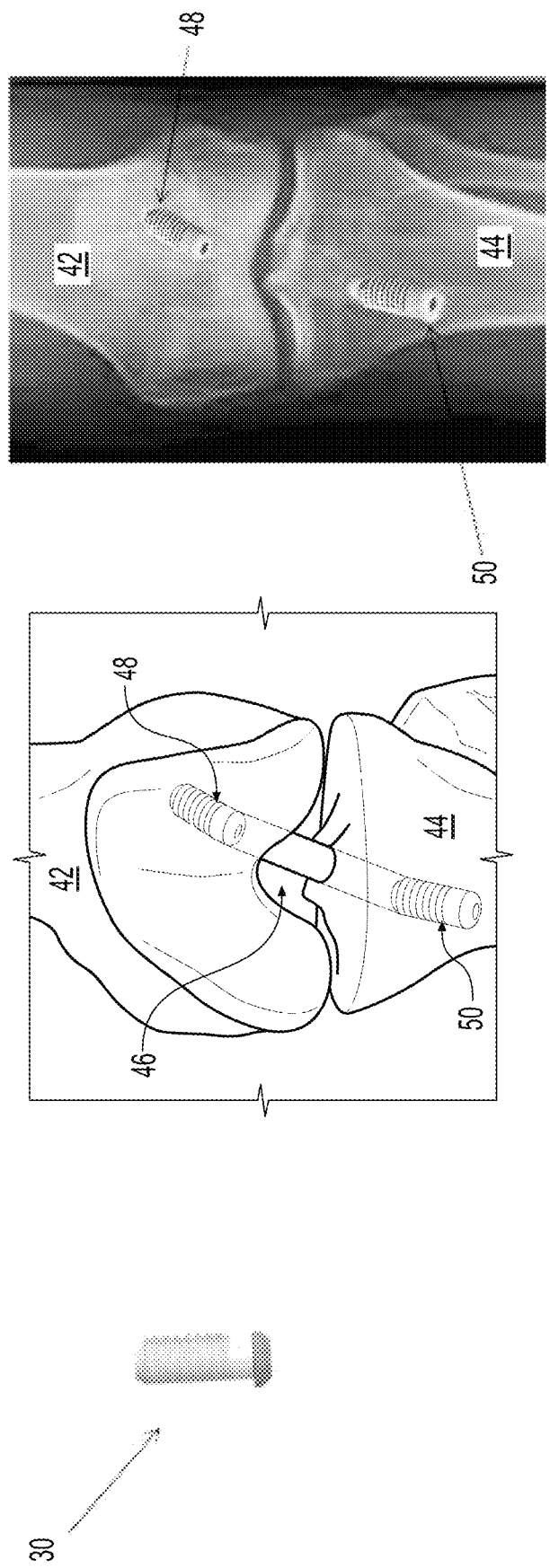
FIG. 2A is an illustration of an implantable device in accordance with an exam ple em bodiment.

FIG. 2C is an illustration of a fluoroscope image of femur and tibia showinq implantable devices for providing measurement data in accordance with an example embodiment.

Figures 3A, 3B:
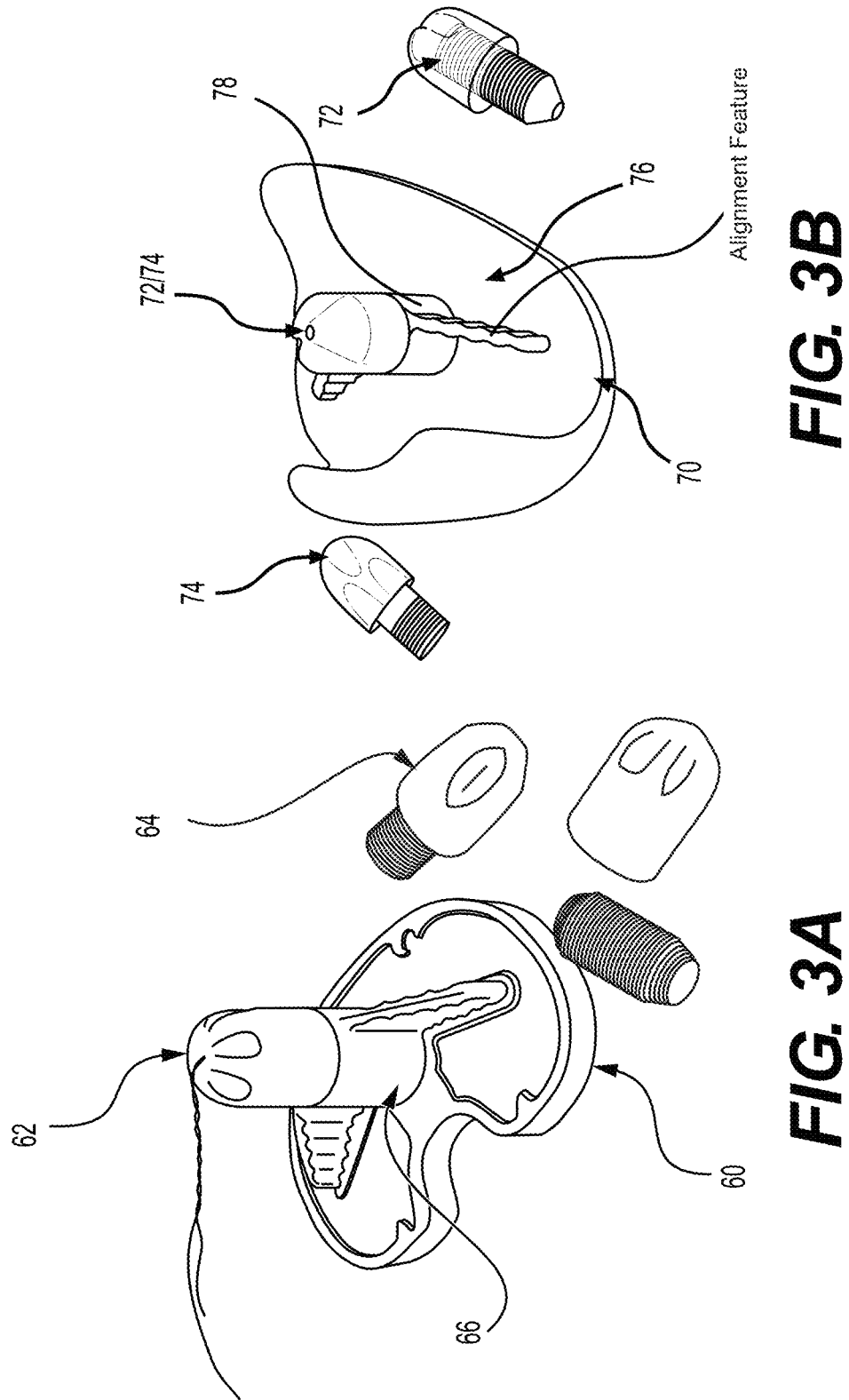

FIG. 3A is an illustration of a prosthetic component adapted for postoperative pathway of care in accordance with an example embodiment.

FIG. 3B is an illustration of a prosthetic component adapted for postoperative pathway of care in accordance with an example embodiment.

Figure 3D:
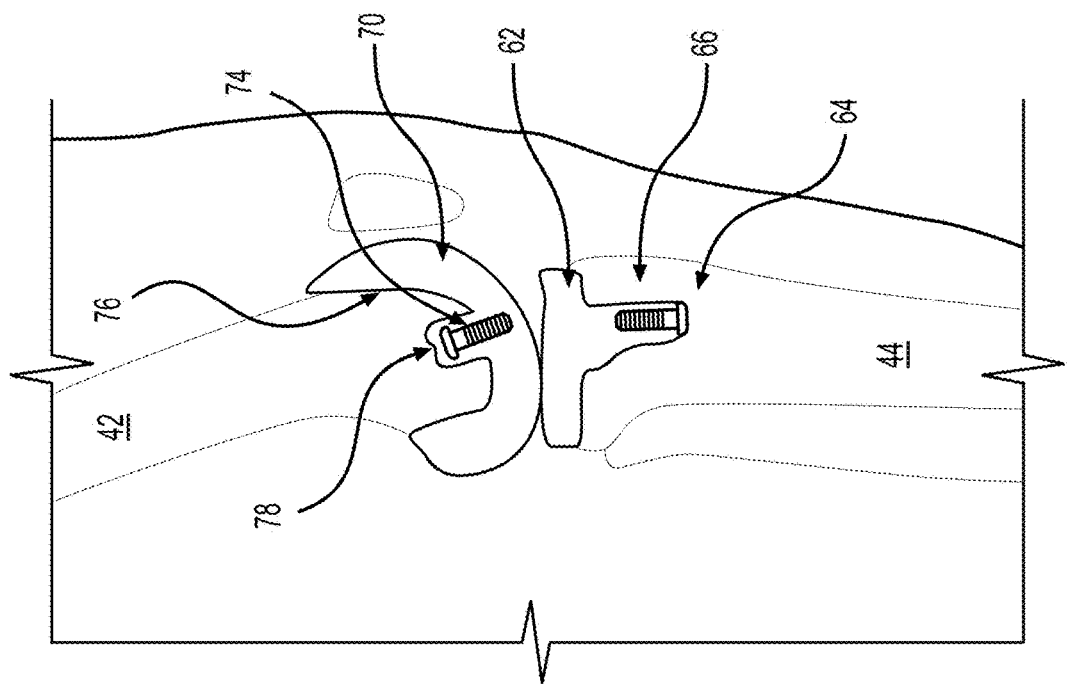
Figure 3C:
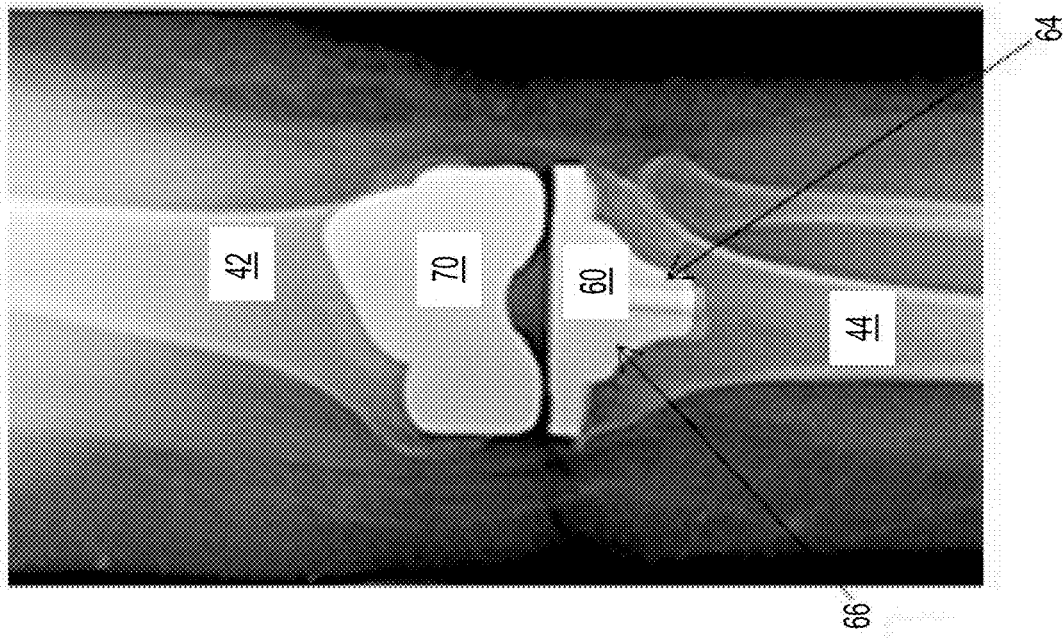

FIG. 3C is a front view fluoroscope image of a first prosthetic component and a second prosthetic component installed in a knee ioint in accordance with an example embodiment.

FIG. 3D is a side view fluoroscope image of a first prosthetic component and a second prosthetic component installed in a knee ioint in accordance with an example embodiment.

Figure 4:
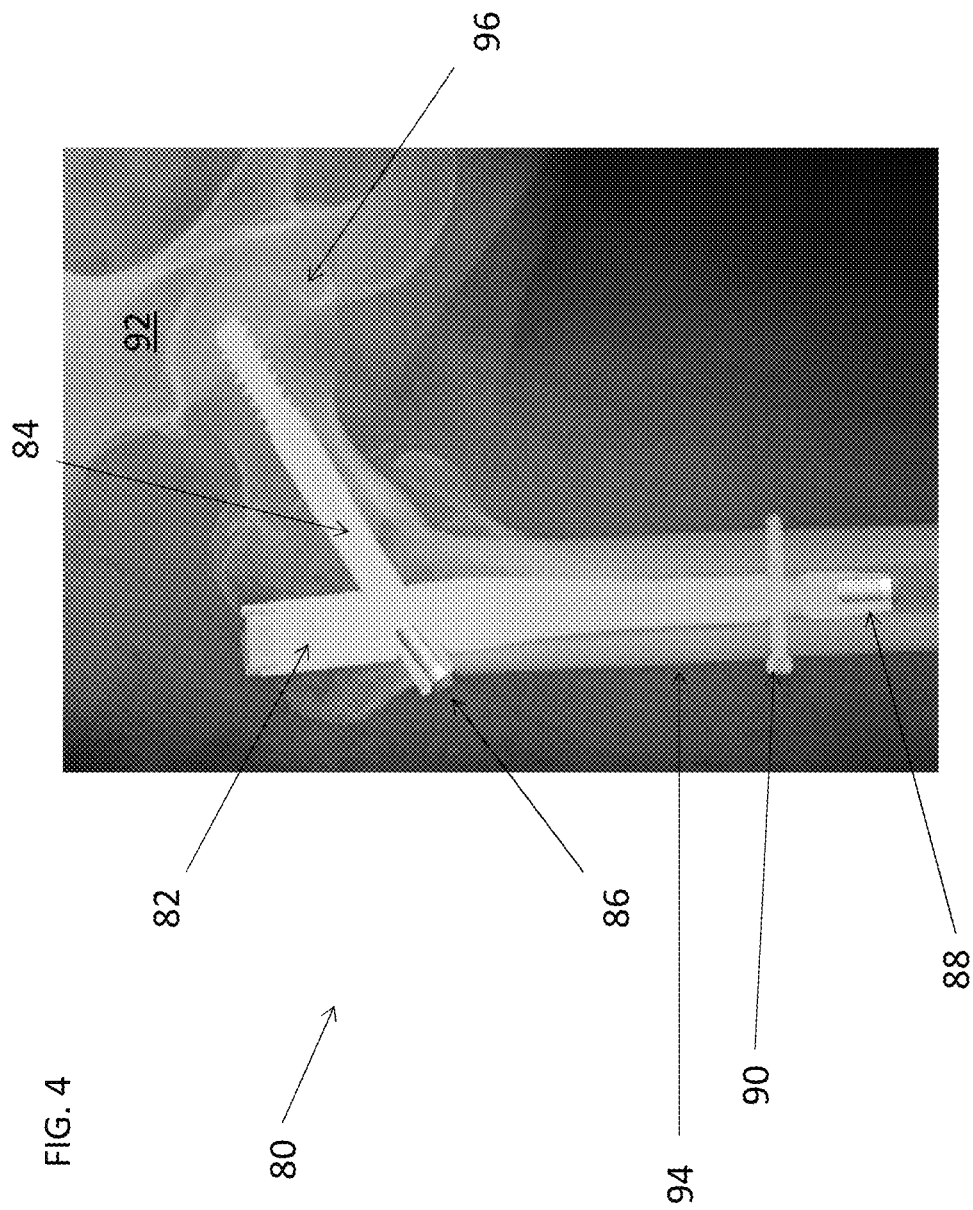

FIG. 4 is a fluoroscope imaqe of a repair of a hip ioint with a screw and a screw in accordance with an example embodiment.

Figure 5:
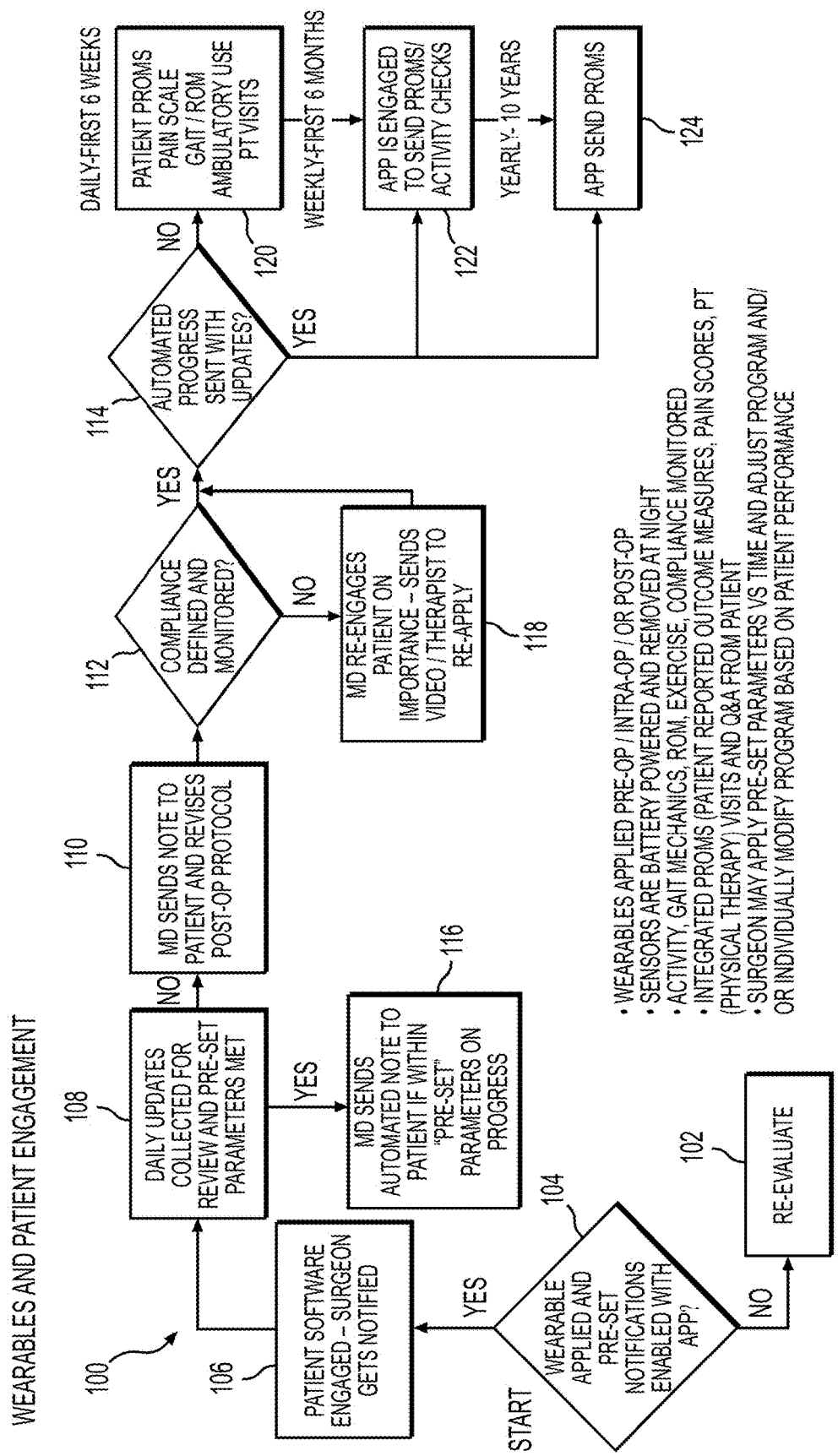

FIG. 5 is a workflow usinq a one or more wearable devices in accordance with an example embodiment.

Figure 6:
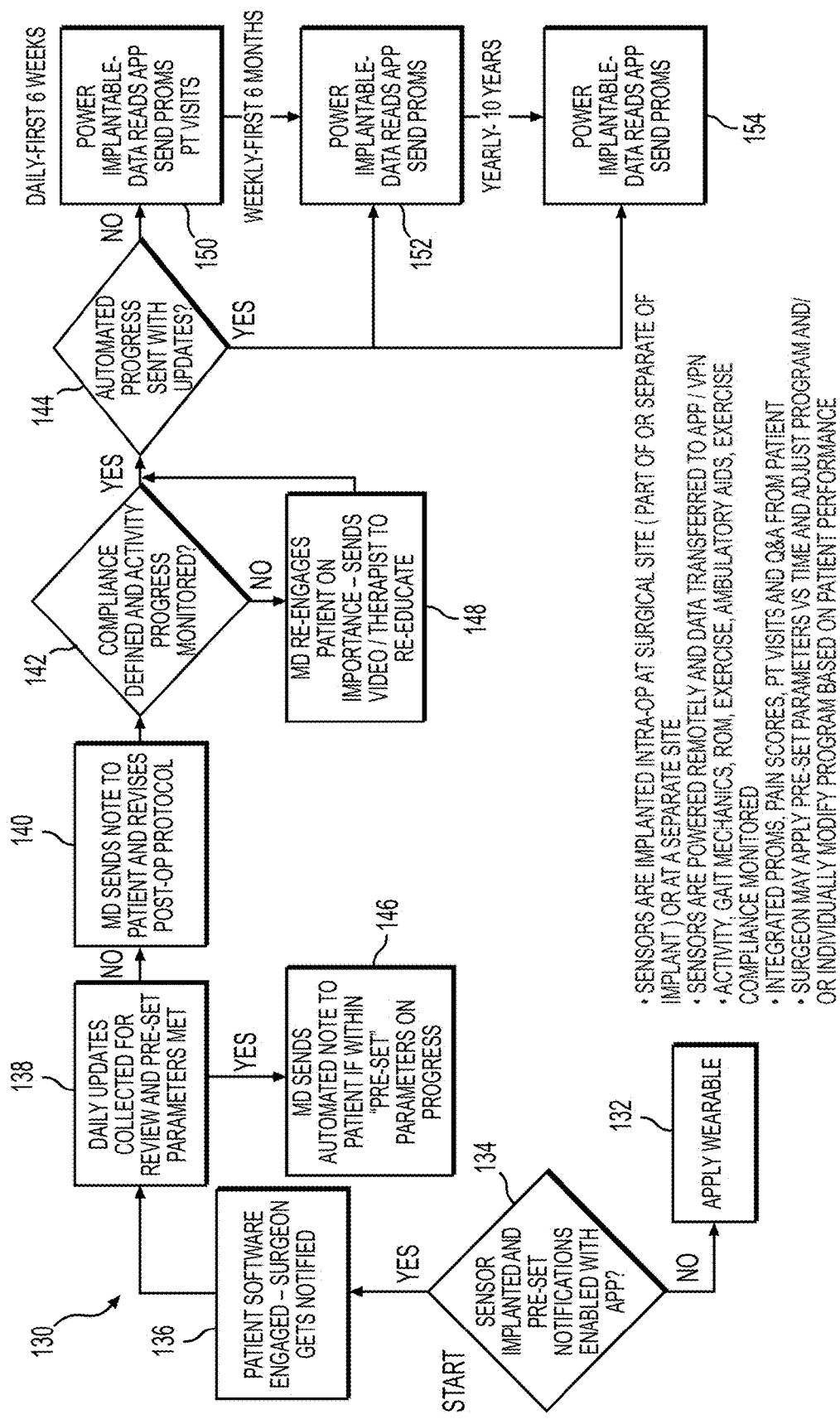

FIG. 6 is a workflow usinq a one or more implantable devices in accordance with an example embodiment.

DETAILED DESCRIPTION

The following description of exemplary embodiment(s) is merely illustrative in nature and is in no way intended to limit the invention, its application, or uses.

Processes, techniques, apparatus, and materials as known by one of ordinary skill in the art may not be discussed in detail but are intended to be part of the enabling description where appropriate.

While the specification concludes with claims defining the features of the invention that are regarded as novel, it is believed that the invention will be better understood from a consideration of the following description in conjunction with the drawing figures, in which like reference numerals are carried forward.

The example embodiments shown herein below of implantable devices or wearable devices are illustrative only and do not limit use for other parts of a body or for other applications. The implantable devices or wearable devices are used to measure at least parameter to generate quantitative measurement data. In one embodiment, each implantable device or wearable device will have a sensor configured to measure movement, position, or orientation. In one embodiment the sensor configured to measure movement, position, or orientation is an inertial measurement unit (IMU). The implantable devices or wearable devices disclosed herein below are configured to support health, healing, and generate quantitative measurement data related to the human body. The implantable devices or wearable devices are an end to end solution for providing a pathway of care from pre-operative assessment, intra-operative surgery, and post-operative care and maintenance. In one embodiment, the implantable devices or wearable devices. are configured to couple to a musculoskeletal system and can be used on or in the knee, hip, ankle, spine, shoulder, hand, wrist, foot, fingers, toes, bone, muscle, ligaments, tendons and other areas of the musculoskeletal system. Although one or more examples may describe uses in regards to the musculoskeletal system the principles disclosed herein are meant to be adapted for use to all locations on or within the human body. The following description of embodiment(s) is merely illustrative in nature and is in no way intended to limit the invention, its application, or uses.

For simplicity and clarity of the illustration(s), elements in the figures are not necessarily to scale, are only schematic and are non-limiting, and the same reference numbers in different figures denote the same elements, unless stated otherwise. Additionally, descriptions and details of well-known steps and elements are omitted for simplicity of the description. Notice that once an item is defined in one figure, it may not be discussed or further defined in the following figures.

The terms "first", "second", "third" and the like in the Claims or/and in the Detailed Description are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

Processes, techniques, apparatus, and materials as known by one of ordinary skill in the art may not be discussed in detail but are intended to be part of the enabling description where appropriate.

The orientation of the x, y, and z-axes of rectangular Cartesian coordinates is assumed to be such that the x and y axes define a plane at a given location, and the z-axis is normal to the x-y plane. The axes of rotations about the Cartesian axes of the device are defined as yaw, pitch and roll. With the orientation of the Cartesian coordinates defined in this paragraph, the yaw axis of rotation is the z-axis through body of the device. Pitch changes the orientation of a longitudinal axis of the device. Roll is rotation about the longitudinal axis of the device. The orientation of the X, Y, Z axes of rectangular Cartesian coordinates is selected to facilitate graphical display on computer screens having the orientation that the user will be able to relate to most easily. Therefore the image of the device moves upward on the computer display whenever the device itself moves upward for example away from the surface of the earth. The same applies to movements to the left or right.

Although inertial sensors are provided as enabling examples in the description of embodiments, any tracking device (e.g., a GPS chip, acoustical ranging, accelerometer, magnetometer, gyroscope, inclinometers, or MEMs devices) can be used within the scope of the embodiments described.

At least one embodiment is directed to a kinetic orthopedic measurement system that is configured to measure motion, position, or orientation. The measurement system can be used pre-operatively, intra-operatively, or post-operatively to provide measurement data support a patient's quality of life. Although the measurement system is generic to any orthopedic assessment, pre-operative measurement, surgery, rehabilitation, or long-term monitoring (e.g., spinal, shoulder, knee, hip, ankle, wrist, finger, toe, bone, musculoskeletal, etc.) the following examples deal with the use in the orthopedic field as a non-limiting example of an embodiment of the invention.

The non-limiting embodiment described herein is related to quantitative measurement used for orthopedic assessment and referred to herein as the kinetic system. The kinetic system includes a sensor system that provides quantitative measurement data and feedback that can be provided visually, audibly, or haptically to a patient, doctor, medical staff, therapist, surgeon or surgical team. The kinetic system provides real-time dynamic data regarding sensor information and position information related to the musculoskeletal system. A device with sensors can be a wearable device, installed in a tool or equipment, part of a prosthetic component, or be implanted within the musculoskeletal system for reporting movement, position, or orientation related to kinetic or kinematic assessment.

In general, kinetics is the study of the effect of forces upon the motion of a body or system of bodies. Disclosed herein is a system for kinetic assessment of the musculoskeletal system. The kinetic system can be for monitoring and assessment of the musculoskeletal system or installed prosthetic components coupled to the musculoskeletal system. For example, installation of a prosthetic component can require one or more bone surfaces to be prepared to receive a device or component. The kinetic system is designed to take quantitative measurements related to movement of one or more bones of the musculoskeletal system, take measurements from one or more sensors to monitor health, or provide therapy to support healing. The sensors are designed to allow ligaments, tissue, and bone to be in place while the quantitative measurement data is taken. This is significant because the bone cuts take into account the kinetic forces where a kinematic assessment and subsequent bone cuts could be substantial changed from an alignment, load, and position of load once the joint is reassembled. In one embodiment, one or more devices can be coupled to one or more bones of the musculoskeletal system. In one embodiment the one or more devices can measure position, movement, acceleration, and relative motion. In one embodiment, one or more implantable devices can be implanted in one or more bones to provide measurement data. Alternatively, one or more sensors can be coupled to the skin as a flexible patch. In one embodiment, the implantable devices can be in communication with the implantable devices as a system working together to in a specific application.

A prosthetic joint installation can benefit from quantitative measurement data in conjunction with subjective feedback of the prosthetic joint to the surgeon. Pre-operative measurement data can be collected to provide a patient pathology and set expectations and outcomes from a surgical or prosthetic component solution. The quantitative measurements can be used to determine adjustments to bone, prosthetic components, or tissue prior to final installation. Permanent sensors can also be housed in final prosthetic components to provide periodic data related to the status of the implant. Alternatively one or more devices can be coupled to bone during surgery to install the prosthetic component or prosthetic joint. The one or more devices act independently from the prosthetic component or prosthetic joint. Data collected intra-operatively and long term can be used to determine parameter ranges for surgical installation and to improve future prosthetic components. One or more sensors used post-operatively can be used to monitor motion of the musculoskeletal system to determine how the repair is performing and provide feedback based on quantitative measurement data. The physical parameter or parameters of interest can include, but are not limited to, measurement of alignment, load, force, pressure, position, displacement, density, viscosity, pH, spurious accelerations, color, movement, chemical composition, particulate matter, structural integrity, and localized temperature. Often, several measured parameters are used to make a quantitative assessment. A graphical user interface can support assimilation of measurement data. Parameters can be evaluated relative to orientation, alignment, direction, displacement, or position as well as movement, rotation, or acceleration along an axis or combination of axes by wireless sensing modules or devices positioned on or within a body, instrument, appliance, equipment, or other physical system.

At least one embodiment is directed to a system for adjusting or monitoring position of the musculoskeletal system for stability, alignment, balance, and range of motion. Examples of monitoring can comprise: a prosthetic component configured to rotate after being coupled to a bone; a sensored prosthesis having an articular surface where the sensored prosthesis is configured to couple to a second prosthetic component, the sensored prosthesis has a plurality of load sensors coupled to the articular surface and a position measurement system configured to measure position, slope, rotation, or trajectory, a remote system configured to wirelessly receive quantitative measurement data from the sensored prosthesis where the remote system is configured to display the articular surface, where the remote system is configured to display position of applied load to the articular surface, and where the remote system is configured to report impingement as the musculoskeletal joint is moved through a range of motion (ROM).

Embodiments of the invention are broadly directed to measurement of physical parameters. Many physical parameters of interest within physical systems or bodies can be measured by evaluating changes in the characteristics of energy waves or pulses. As one example, changes in the transit time or shape of an energy wave or pulse propagating through a changing medium can be measured to determine the forces acting on the medium and causing the changes. The propagation velocity of the energy waves or pulses in the medium is affected by physical changes in of the medium. The physical parameter or parameters of interest can include, but are not limited to, measurement of load, force, pressure, displacement, density, viscosity, localized temperature. These parameters can be evaluated by measuring changes in the propagation time of energy pulses or waves relative to orientation, alignment, direction, or position as well as movement, rotation, or acceleration along an axis or combination of axes by wireless sensing modules or devices positioned on or within a body, instrument, appliance, vehicle, equipment, or other physical system.

In all of the examples illustrated and discussed herein, any specific materials, temperatures, times, energies etc. . . . for process steps or specific structure implementations should be interpreted to be illustrative only and non-limiting. Processes, techniques, apparatus, and materials as known by one of ordinary skill in the art may not be discussed in detail but are intended to be part of an enabling description where appropriate.

Note that similar reference numerals and letters refer to similar items in the following figures. In some cases, numbers from prior illustrations will not be placed on subsequent figures for purposes of clarity. In general, it should be assumed that structures not identified in a figure are the same as previous prior figures.

In the present invention these parameters are measured with an integrated wireless sensing module or device comprising an i) encapsulating structure that supports sensors and contacting surfaces and ii) an electronic assemblage that integrates a power supply, sensing elements, ultrasound resonator or resonators or transducer or transducers, an accelerometer, antennas and electronic circuitry that processes measurement data as well as controls all operations of energy conversion, propagation, and detection and wireless communications. The wireless sensing module or device can be positioned on or within, or engaged with, or attached or affixed to or within, a wide range of physical systems including, but not limited to instruments, appliances, vehicles, equipments, or other physical systems as well as animal and human bodies, for sensing and communicating parameters of interest in real time.

While the present invention has been described with reference to particular embodiments, those skilled in the art will recognize that many changes may be made thereto without departing from the spirit and scope of the present invention. Each of these embodiments and obvious variations thereof is contemplated as falling within the spirit and scope of the invention.

An implanted device can incorporate microelectronic integration into a navigation system. There is a need for appropriate tunnel placement in the tibia or femur to support healing and post-operative function. Problems can occur if the graft is placed inappropriately causing impingement, pain limited range of motion, and graft failure. In one embodiment, the surgeon can place the implanted device in the intra-articular non-loaded area of the femur and one in the tibia. The navigation system registers the fiducials relative to the femoral and tibial bone model of the patient. A pre-operative MRI can be utilized or an intra-operative ultra-scan to register femur and tibia to the navigation system. In the example, the implanted device will have IMU (inertial measurement unit) electronics that can be registered or related to a bone through a registration process. The implanted device can include one or more MEMs (micro-electro-mechanical systems) devices, a camera, or video device. In the example, measurement data from the implanted device can be transmitted to a computer having a display to provide the measurement data in real-time.

Figure 1:
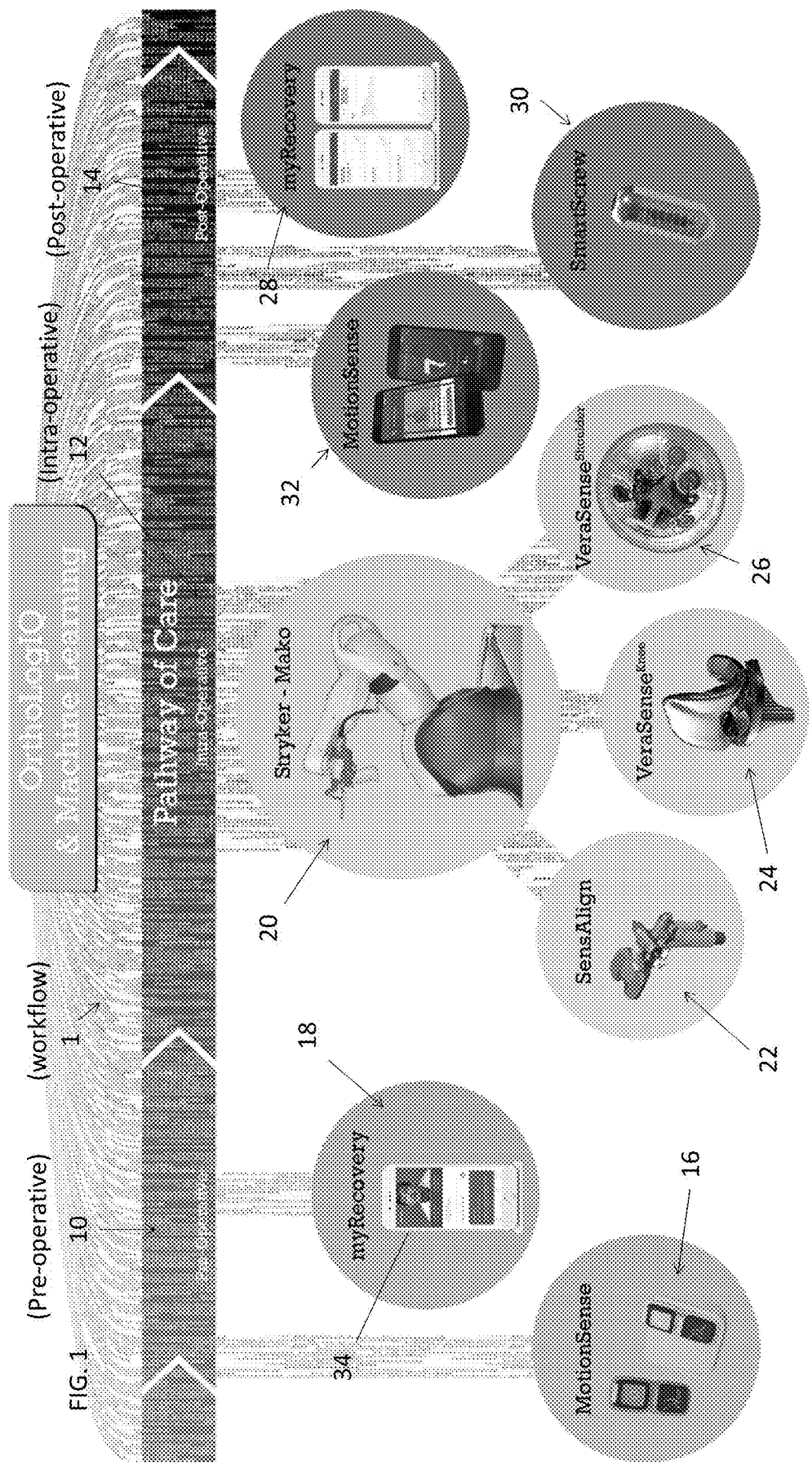
FIG. 1 is an illustration of a surgical system in accordance with an example embodiment.

FIG. 1 is an illustration of a workflow 1 for an installation of a prosthetic component or a prosthetic joint in accordance with an example embodiment. The workflow a pathway of care that encompasses pre-operative, intra-operative, and post-operative management of a patient. In general, the workflow uses one or more devices with sensors to generate quantitative measurement data related to the patient activity, gait mechanics, range of motion, prosthetic component installation, or exercise. The pre-operative measurement data, intra-operative measurement data, and post-operative measurement data is assessed as a whole to support rehabilitation, reliability, and performance for the life of the patient. The workflow 1 further integrates patient reported outcome measures, pain scores, physical therapy visits, and questions and answers from the patient. One aspect of workflow 1 is to provide feedback to the patient that encourages progress to improve a quality of life after installation of the prosthetic component or prosthetic joint. Another aspect of workflow 1 is to provide measurement data of the progress of the patient to the surgeon, doctor, or healthcare provider. In general, workflow 1 provides quality patient care while minimizing surgeon, doctor, or healthcare provider interaction with the patient unless the interaction is warranted by measurement data or patient reported outcome measures (PROMS). The goal of workflow 1 is to maximize care for the patient when needed through compliance monitoring whereby the patient progress is monitored and guidance given through an application used by the patient on a device configured for running the application. The surgeon, doctor, or healthcare provider has interaction with the patient as required based on measurement data, question & answers, and surveys provided by the application. Workflow 1 improves the quality of care, allows a surgeon, doctor, or healthcare provider to handle more patients, and provides long-term monitoring of the prosthetic installation.

In a pre-operative pathway of care 10 the patient visits the doctor in preparation to install a prosthetic component or a prosthetic joint. In general, the patient will have a computer 34 configured to install an application 18 that is used in conjunction with a wearable device 16 that is configured to couple to a musculoskeletal system of the patient to receive the prosthetic component or prosthetic joint. The computer has a processor, digital signal processor, microcontroller, or digital logic to install the application. Examples of computer 34 are a medical device, cell phone, tablet, personal computer, or other portable device. Application 18 can be used to address commonly asked questions about a procedure. Application 18 can be used to contact a surgeon, doctor, or healthcare provider if the questions/answers are insufficient or requires more specificity to the patient. A person having knowledge related to the question can respond to the inquiry instead of the surgeon or doctor. Checklists can also be provided corresponding to the entirety of an installation of a prosthetic component or a prosthetic joint. Required information prior to surgery can also be provided thru application 18. In one embodiment, the patient will complete patient reported outcomes measures (PROM) survey prior to the surgery. The PROM survey will be reviewed by the surgeon or surgeon's office before the surgery occurs. In the example, wearable devices 16 comprise one or more devices configured to couple to the musculoskeletal system. A wearable device includes one or more sensors, electronic circuitry, and can have an internal power source or be configured to receive power from an external source. The electronic circuitry is coupled to the one or more sensors and is configured to control a measurement process and transmit measurement data. Computer 34 is in communication with wearable devices 16 and is configured to receive measurement data from wearable devices 16. Wearable devices 16 each include at least an inertial measurement unit (IMU) to measure movement, position, or orientation but can include other sensors. In one embodiment, wearable devices 16 comprise a first wearable device and a second wearable device to monitor movement, position, or orientation of a musculoskeletal system that is being considered for joint replacement surgery. In one embodiment, wearable devices 18 can be in a sleeve that is put over the joint. Alternatively, wearable devices can be a patch device that is coupled to the skin of the patient. For example, the first wearable device can be coupled to a thigh of a leg and the second wearable device is coupled to the calve of the leg of the patient. The first wearable device coupled to the thigh couples the IMU of the first wearable device to the femur of the leg. The second wearable device coupled to the calve couples the IMU of the second wearable device to the tibia of the leg. Pre-operative pathway of care 10 is configured to generate measurement data related to the leg for assessment by the surgeon or doctor.

Computer 34 is used in conjunction with wearable devices 16. Application 18 is a program that supports the generation of measurement data from wearable devices 16 and interaction with the surgeon, doctor, or healthcare provider. Application 18 is configured to provide information that supports the surgical installation of the prosthetic component or prosthetic joint to achieve a positive patient outcome. Application 18 interacts with the patient to monitor activity. More specifically, application 18 in conjunction with wearable devices 16 can direct the patient through an activity such as a range of motion of the joint, specific exercises, or predetermined movements. Movement, position, or orientation of wearable devices during the activity is stored by application 18. Application 18 may further include software that analyzes the activity to provide the information in a form relevant to the surgeon, doctor, or healthcare provider. Application 18 directing the patient through an activity will provide feedback on results of the activity and whether the activity is being performed correctly. The application will further interact with the patient with surveys or questions related to the musculoskeletal system prior to the surgery. The surgeon, doctor, or healthcare provider can use the measurement data and information generated during the pre-operative pathway of care to support the intra-operative pathway of care 12.

Workflow 1 further includes intra-operative pathway of care 12. Intra-operative pathway of care 12 includes example devices 20, 22, 24, or 26 configured to support surgical installation of the prosthetic component or the prosthetic joint in the patient. Information generated during the pre-operative pathway of care 10 is used as preliminary guideline to support the selected prosthetic component(s) to be installed and generate a pre-plan for the installation of the selected prosthetic components. Intra-operative devices have sensors that generate quantitative measurement data related to the installation. The sensors can provide measurement data that indicates one or more changes to the pre-operative plan. Device 20 is an orthopedic surgical robot configured to assist the surgeon in making bone cuts to install the prosthetic components. Device 20 can also include a navigation system that monitors movement, position, and orientation of the musculoskeletal system. Device 20 can include tools coupled to the robot having sensors to provide measurement data. In one embodiment, the orthopedic surgical robot can use any or all of the devices listed herein below. Device 22 is a tool configured to support one or more bone cuts. Device 22 includes a distraction mechanism, a tilt mechanism, a load measurement system, and an IMU. The sensors on device 22 are configured to affect balance, alignment, rotation, and loading of the installed joint when making a bone cut. Device 24 is a trialing device that is identical to a final prosthetic component that is installed. Device 24 includes at least load sensors and an IMU to support balance, alignment, rotation and loading measurements of the installation. The measurement data from device 24 can indicate if further changes are needed to optimize the installation. In the example, device 24 is equivalent to the final prosthetic component being installed. Thus, measurement data generated by device 24 is equal to what the final prosthetic component will measure when installed. As shown, device 24 is used in a total knee arthroplasty. Similarly, device 26 is a trialing device having a spherical surface for coupling to a joint of the musculoskeletal system. In one embodiment, device 26 is for a shoulder joint. Device 26 includes at least load sensors and an IMU to support balance, alignment, rotation and loading measurements of the installation. The measurement data by device 24 is equal to what the final prosthetic component will measure when installed. In general, the measurement data from devices 20, 22, 24, or 26 are provided to a computer having a display to be provided in real-time to a surgeon to support installation of the prosthetic component or the prosthetic joint. The measurement data is also provided to a database that is configured to support patient care after the installation of the prosthetic component or prosthetic joint is completed taking into account quantitative measurements related to the installation.

Workflow 1 further includes post-operative pathway of care 14. After surgery has been completed the patient must undergo a rehabilitation process that includes healing of the wound, infection prevention, and joint usage. Ultimately, the rehabilitation process occurs in the shortest possible time improving the patient's quality of life with increased mobility and no pain. Post-operative pathway of care 14 provides doctor monitoring and intervention if required. Post-operative pathway of care 14 includes one or more applications to generate quantitative measurement data related to rehabilitation of the patient post-surgery. The quantitative measurement data is used prevent problems, address issues in the shortest possible time frame, provide patient feedback, encourage rehabilitation, change or adapt a patient exercise regimen based on patient progress or needs. Moreover, the one or more applications used in post-operative pathway of care 14 maximize the number of patients a surgeon, doctor, or healthcare provider can support while improving care for the patient. In one embodiment, an application 28 and an application 32 can be downloaded to a computer. In general, the computer has a processor, digital signal processor, microcontroller, or digital logic to install the application. Examples of the computer are a medical device, cell phone, tablet, personal computer, or other portable device. In one embodiment, the computer can be the same computer 34 used in pre-operative pathway of care 10.

In one embodiment, application 28 is configured to support interaction between the patient, surgeon, doctor, or healthcare provider. Application 28 is configured to get relevant information to the appropriate healthcare provider for an informed response, assessment, or management of care while minimizing office visits if not required. In general, application 28 is configured to improve patient experience and outcomes, provide more personal care, while reducing the cost and time required per patient for the surgeon, doctor, or healthcare provider. Messages from the patient to the surgeon, doctor, or healthcare provider or from the surgeon, doctor, or healthcare provider can be provided through application 28. Therefore application 28 acts as a pathway to and from the patient that does not require physical presence but maintaining contact. Continuous interaction through application 28 with the patient allows expectations by the patient to be managed by providing input or information as needed. Another outcome of using application 28 interactivity with the patient is to reduce anxiety and have them feel supported during the recovery process which can be difficult on the patient. Aspects of the rehabilitation process may be compliance monitored to ensure improvement of the patient. In general, application 28 improves compliance using patient reported outcome measures, generate data on a large number of post-operative surgical cases, and use the information to improve care and performance for patients without increasing surgeon, doctor, or healthcare provider time per patient. In fact, the goal would be to reduce the time spent while reducing patient anxiety.

Application 32 of post-operative pathway of care 14 provides an interactive portal to the surgeon, doctor, or healthcare provider during the recovery process. Furthermore, application 32 is configured to provide educational content and post-operative guidance to the patient after the surgery is complete. In one embodiment, the patient will computer a patient reported outcome measures (PROM) survey after surgery to monitor progress. Upon completion the PROM survey is sent to the surgeon for review through application 32. In, applications 28 and 32 can be integrated with one or more health systems, registry programs or wearable devices with sensors during a rehabilitation process and long-term monitoring of the prosthetic component or prosthetic joint. In one embodiment, application 32 of post-operative pathway of care 14 is configured to support a rehabilitation process, monitor progress, provide feedback, provide encouragement, and report to the surgeon, doctor, or healthcare provider. Furthermore, application 32 includes a daily pain journal, home exercise program, as well as helpful notifications relevant to the current state of the post-operative rehabilitation. In one embodiment, appointments to the surgeon, doctor, or healthcare provider is managed by applications 28 or 32. The appointment may be determined by monitoring progress of the rehabilitation, surveys, and follow-up questions/responses provided by through application 32. The data collection by application 32 is provided to the surgeon, doctor, or healthcare provider to support continuous monitoring of progress thereby providing timely recommendation to the recovery plan. In one embodiment, the surgeon can create and approve all content on application 32. Based on experience of the surgeon and the data collection, the surgeon, doctor, or healthcare provider can provide additional tips or advice as necessary to accelerate the rehabilitation. Rehabilitation after a prosthetic component or prosthetic joint installation is a slow process requiring much effort from the patient. Application 32 tracks and monitors progress that is reported to the appropriate people. Milestones related to the progress are celebrated through application 32 thereby showing the patient the improvements through hard work they have made. In one embodiment, application 32 manages exercise routines that can be reviewed on the computer in real-time. The physio is essential in the recovery process. Application 32 can teach the exercise on the computer but can also monitor the patient trying to repeat the exercise in real-time. In one embodiment, videos can be provided on the application with detailed instructions on everything from wound care, infection detection, pain mitigation, or exercise programs. Measurement data from one or more sensors can be used to monitor exercise routines. In one embodiment, through application 32 a personal trainer is not required to support rehabilitation. In one embodiment, following application 32 is more than sufficient to the lead the patient to full recovery after surgery by achieving goals that are time dependent from when the surgery occurred.

The surgeon, doctor, or healthcare provider will know if the patient is not improving through the use of one or more devices that are used to monitor and measure the musculoskeletal system. The measurement data from the one or more devices is reported through application 32 to the surgeon, doctor, or healthcare provider. As mentioned previously in pre-operative pathway to care 10, wearable devices can be coupled to the skin or coupled to the musculoskeletal system via a wrap to monitor movement of the prosthetic joint or prosthetic component. In one embodiment, wearable devices are not used in post-operative monitoring of the patient. One or more implantable devices 30 are implanted during the prosthetic component surgery. Implantable devices 30 at a minimum have an IMU to monitor motion of the musculoskeletal system in conjunction with application 32. In one embodiment, implantable devices 30 do not have an internal power source. Implantable devices 30 can be powered through induction, energy harvesting, radio frequency signals, or electromagnetic signals to complete a measurement process. In one embodiment, implantable devices 30 are a screw. The screws will have an internal cavity housing electronic circuitry and at least the IMU. The electronic circuitry couples to the IMU and is configured to control a measurement process and transmit measurement data. The computer is configured to receive the measurement data and use the measurement data within application 32. The measurement data will also be provided through the application to the surgeon, doctor, or healthcare provider. In one embodiment, the screws are configured to couple to a prosthetic component as disclosed herein below. The sensors within the screws are not limited to the IMU but can be any sensor configured to measure movement, position, or orientation. The sensors within screws can also support pain mitigation, detect infection, or measure other parameters of interest. Implantable devices 30 or wearable devices are an important aspect of providing real-time feedback to the patient to support continuous improvement. Application 32 will teach, display in real-time, monitor exercises or movements, provide data relevant data to the patient and provide feedback as milestones are achieved.

FIG. 2A is an illustration of implantable device 30 in accordance with an example embodiment. Implantable device 30 is disclosed herein above in FIG. 1 for use in post-operative pathway of care 14. More than one implantable device 30 can be used with applications 18, 28, and 32 installed on a computer 34. Implantable device 30 includes electronic circuitry and at least one sensor configured to measure movement, position, or orientation. In one embodiment, the at least one sensor is an IMU. Implantable device can have a power source such as a battery. In one embodiment, implantable device 30 can have an energy harvesting device configured to power the electronic circuitry. In one embodiment, implantable device 30 can receive energy from an external source that couples to the implantable device 30. The energy can be electromagnetic, light, infrared, inductive, or radio frequency to name but a few. Implantable device 30 is configured to receive energy, convert the energy for powering the electronic circuitry and sensors, and store sufficient energy to energize the electronic circuitry to complete one task. In one embodiment, the external energy can be continuously provided to support continuous operation of implantable device 30. Implantable device 30 is configured to control a measurement process and communicate with a computer having application 28, application 32, or both. In one embodiment, communication with computer can be wireless. Alternatively, wires from implantable device 30 can be brought through the skin for a wired connection. As shown, implantable device 30 is a screw having threads. The screw can be configured to couple to a bone of the musculoskeletal system to provide measurement data related to movement, position, and orientation of the bone. Alternatively, implantable device 30 is a device configured to couple to the musculoskeletal system. Implantable device 30 being coupled to bone supports very accurate measurement of the movement, position, or orientation of the bone compared to a wearable or sleeve since the placement is permanent to the bone. As disclosed herein above, implantable device 30 can include other sensors to measure one or more parameters.

FIG. 2B is an illustration of one or more implantable devices holding a ligament of a musculoskeletal system to a femur 42 and a tibia 44 of a leg in accordance with an example embodiment. A ligament tear or replacement of a ligament can be coupled to a bone using a screw. In the example, a screw 48 and a screw 50 are used to hold ligament 46 respectively to femur 42 and tibia 44. Screw 48 and screw 50 are identical in function to implantable device 30 disclosed herein above each having electronic circuitry, an IMU, and configured to receive power from an external source. In one embodiment, drill holes for screw 48 and screw 50 are drilled and tapped. Screw 48 is coupled to the drill hole in femur 42 and holds a first end of ligament 48 to femur 42. Screw 50 is coupled to the drill hole in tibia 44 and holds a second end of ligament 50 to tibia 44. In one embodiment, a precise position of screw 48 and screw 50 is respectively known to a mechanical axis of femur 42 and tibia 44. A registration process can also be performed with screws 48 and 50 to locate positions relative to femur 42 and tibia 44. Thus, using implantable devices to repair ligament damage can also support post-operative pathway of care 14 of FIG. 1 using applications 32 or 28 to support patient rehabilitation with screws 48 and 50 to generate measurement data.

FIG. 2C is an illustration of a fluoroscope image of femur 42 and tibia 44 showing implantable devices for providing measurement data in accordance with an example embodiment. Screws 48 and 50 are respectively shown in femur 42 and tibia 44. Screws 42 and 50 are equivalent to implantable device 30 of FIG. 2A but configured for holding a ligament to bone. Screws 42 and 50 are designed to repair ligament damage but at the same time support rehabilitation in post-operative pathway to care 14 of FIG. 1 using applications 32 or 28. The computer having application 28 or 32 are configured to transmit measurement data corresponding to bone movement, position, and orientation to support post-operative care and feedback.

FIG. 3A is an illustration of a prosthetic component 60 adapted for post-operative pathway of care 14 in accordance with an example embodiment. Prosthetic component 60 is configured for installation in a total joint arthroplasty. Prosthetic component 60 is configured to receive a screw 62 or a screw 64 for post-operative treatment. Screw 62 or screw 64 are equivalent to implantable device 30 of FIG. 2A having at least a sensor configured to measure movement, position, or orientation of the musculoskeletal system but adapted for mounting to a prosthetic component. In one embodiment, screws 62 and 64 will have an IMU for reporting movement, position, or orientation. Screw 62 or screw 64 can include other sensors to measure one or more parameters. Screw 62 has wires extending from screw 62 for a wired coupling to send and receive information. Screw 64 is configured for wireless transmission. Screws 62 and 64 can be powered by an internal energy source, energy harvesting, or external power source that couples energy through inductive, electromagnetic, light, radio frequency signal, or other energy means to provide sufficient power to complete a measurement process.

In the example, prosthetic component 60 is for a total knee arthroplasty. Prosthetic component 60 is a tibial prosthetic component. In one embodiment, the tibia has a prepared bone surface for receiving the tibial prosthetic component. Prosthetic component 60 has a stem 66 that extends from a tibial tray. A medullary cavity of the tibia is reamed out to receive stem 66. In one embodiment, prosthetic component 60 is held to the tibia using an adhesive. Stem 66 of prosthetic component 60 is modified where a distal end of stem 66 is hollowed out and threaded to receive screw 62 or screw 64. In the example, the surgeon selects screw 62. Screw 62 is then screws screwed into stem 66 having a fixed position relative to prosthetic component 60. The surgeon would also create a path for the wires extending from screw 62. In one embodiment, the wires would extend through the skin to be coupled to another device. Prosthetic component 60 when coupled to the tibia places screw 62 or screw 64 within the medullary canal of the tibia. Thus, screw 62 or screw 64 coupled to prosthetic component 60 is aligned to the tibia and is easily configured to report movement, position, and orientation of the tibia using applications 28 and 32 on a computer for post-operative pathway of care 14 of FIG. 1.

FIG. 3B is an illustration of a prosthetic component 70 adapted for post-operative pathway of care 14 in accordance with an example embodiment. Prosthetic component 70 is configured for installation in a total joint arthroplasty. Prosthetic component 70 is configured to receive a screw 72 or a screw 74 for post-operative treatment. Screw 72 or screw 74 are equivalent to implantable device 30 of FIG. 2A having at least a sensor configured to measure movement, position, or orientation of the musculoskeletal system but adapted for mounting to a prosthetic component. In one embodiment, screws 72 and 74 will have an IMU for reporting movement, position, or orientation. Screw 72 or screw 74 can include other sensors to measure one or more parameters. Screw 72 has wires extending from screw 72 for a wired coupling to send and receive information. Screw 74 is configured for wireless transmission. Screws 72 and 74 can be powered by an internal energy source, energy harvesting, or external power source that couples energy through inductive, electromagnetic, light, radio frequency signal, or other energy means to provide sufficient power to complete a measurement process.

In the example, prosthetic component 70 is for the total knee arthroplasty. Prosthetic component 70 is a femoral prosthetic component. In one embodiment, the distal end of the femur has one or more prepared bone surface for receiving the femoral prosthetic component. Prosthetic component 70 has one or more alignment features configured to couple to the distal end of the femur. In one embodiment, the femoral prosthetic component is formed having an additional threaded stem 78. The distal end or the femur is drilled having an opening to receive threaded stem 78. Alternatively, a retaining or alignment feature of the femoral prosthetic component can hollowed out and threaded to receive screw 72 or screw 74. In another embodiment, screw 72 or screw 74 can be used to hold the prosthetic component 70 to the distal end of the femur. In one embodiment, prosthetic component 70 is held to the distal end of the femur using an adhesive. In the example, the surgeon selects one of screw 72 with wires or screw 74 without wires to fasten to threaded stem 78. The surgeon would create a path for the wires extending from screw 72. In one embodiment, the wires would extend through the skin to be coupled to another device. Prosthetic component 70 when coupled to the tibia places screw 72 or screw 74 within the distal end of the femur. Thus, screw 72 or screw 74 coupled to prosthetic component 70 is aligned to the femur and is easily configured to report movement, position, and orientation of the femur using applications 28 and 32 on a computer for post-operative pathway of care 14 of FIG. 1.

FIG. 3C is a front view fluoroscope image of prosthetic component 60 and prosthetic component 70 installed in a knee joint in accordance with an example embodiment. In the example, prosthetic component 60 is the tibial prosthetic component coupled to tibia 44. In the example, prosthetic component 70 is a femoral prosthetic component coupled to femur 42. In the example, screw 64 is installed in stem 66 of the tibial prosthetic component. The installation process of the tibial prosthetic component with screw 62 or screw 64 or is similar to the installation a tibial prosthetic component without a device for monitoring movement, position, or orientation. Screw 64 is configured to report movement, position, or orientation of tibia 44 when used with application 28 or application 34 installed on a computer for post-operative pathway of care 14.

FIG. 3D is a side view fluoroscope image of prosthetic component 60 and prosthetic component 70 installed in a knee joint in accordance with an example embodiment. In the example, prosthetic component 60 is the tibial prosthetic component coupled to tibia 44. In the example, prosthetic component 70 is a femoral prosthetic component coupled to femur 42. In the example, screw 64 is installed in stem 66 of the tibial prosthetic component. Similarly, the side view shows screw 76 coupled to a stem formed on prosthetic component 70. In the example, stem 76 extends from the femoral prosthetic component into the distal end of the femur 42. In one embodiment, stem 76 holding screw 72 or screw 74 to the femoral prosthetic component can be an alignment or retaining feature of prosthetic component 70. In one embodiment, a hole is drilled in the distal end of the femur to receive stem 76 and screw 74 as shown in the figure. Screw 64 is configured to report movement, position, or orientation of tibia 44 when used with application 28 or application 34 installed on a computer for post-operative pathway of care 14. Screw 74 is configured to report movement, position, or orientation of femur 42 when used with application 28 or application 34 installed on the computer for post-operative pathway of care 14. Thus, the post-operative pathway of care 14 is installed as part of a standard joint replacement surgery.

FIG. 4 is a fluoroscope image of a repair of a hip joint 80 with a screw 86 and a screw 88 in accordance with an example embodiment. The hip joint comprises a femur head 96 of a femur 94 coupled to acetabulum of the pelvis. The hip joint is a ball and socket joint. Femoral head 96 extends at an angle, typically in a range of 120 degrees to 135 degrees from femur 94. The repair in fluoroscope image comprises a nail 82, a screw 84, and a screw 90. Nail 82 couples in the medullary canal of femur 94. Nail 82 is held in place by screw 84 proximally placed through nail 82 and screw 90 distally placed through nail 82. Nail 82 has openings for receiving screw 84 and screw 90. Screws 84 and 90 provide rotational stability. In one embodiment, screw 90 is a fixed screw. In one embodiment, screw 84 is a telescoping screw that couples from the femur to femoral head 96. The telescoping screw is used to subside to aid in fracture compression and healing. Note that screw 84 takes a similar angle to femur 94 as femoral head 96.

Nail 82 and screw 84 have been adapted for respectively for receiving a screw 88 and a screw 86. Screw 86 or screw 88 are equivalent to implantable device 30 of FIG. 2A having at least a sensor configured to measure movement, position, or orientation of the musculoskeletal system but adapted for mounting to a prosthetic component. In one embodiment, screws 86 and 88 will have an IMU for reporting movement, position, or orientation. Screw 86 or screw 88 can include other sensors to measure one or more parameters. For example screws 86 or 88 can include sensors to measure micro-motion, screw telescoping, or weight bearing fracture forces on the hip joint. Screws 86 or 88 can be powered by an internal energy source, energy harvesting, or external power source that couples energy through inductive, electromagnetic, light, radio frequency signal, or other energy means to provide sufficient power to complete a measurement process. In one embodiment, screw 88 is configured to couple to a distal end of nail 82. The distal end of nail 82 includes a threaded opening configured to receive and retain screw 88. Similarly, a distal end of screw 84 includes a threaded opening configured to receive and retain screw 88. Using screws 84 and 88 respectively in nail 82 and screw 84 does not change the work flow but greatly increases patient support after surgery. Repair of the hip joint when coupled to femur places screw 86 in relation to femoral head 96 and screw 88 in relation to femur 90. Thus, screws 86 and 88 can be used to report patient motion, gait, hip motion (flexion—abduction—extension, adduction—rotation) using applications 28 and 32 on a computer for post-operative pathway of care 14 of FIG. 1.

FIG. 5 is a workflow 130 using a one or more wearable devices in accordance with an example embodiment. The workflow corresponds to computer 34 running applications (app) 18, 28, or 32 of FIG. 1. Computer 34 and applications 18, 28, or 32 will be referred to in reference to workflow 100. As previously mentioned computer 34 can be a cell phone, tablet, notebook computer, medical device or other device configured for running the application and supporting video, audible, or haptic interaction with the patient. Workflow 100 is configured to be used with wearable devices such as wearable device 16 of FIG. 1. Wearable device 16 is configured to couple to the musculoskeletal system. One or more wearable devices 16 can be used with applications 18, 28, or 32. Wearable device 16 is worn external to the body of the patient. For example, wearable device 16 can be a patch that couples to skin or wearable device 16 can be housed in a wrap that holds wearable device 16 to the musculoskeletal system. In one embodiment, wearable device 16 is used in post-operative pathway of care 14 when the patient does not have one or more implanted devices. In the example, wearable device 16 includes at least one sensor configured to measure movement, position, or orientation but can include other sensors to measure one or more parameters. In one embodiment, the at least one sensor is an IMU. In a step 104, the application is pre-set with one or more notifications that are enabled with the app. The patient is engaged with the application and should read or respond to the pre-set notifications. In a step 102, the situation must be reviewed if a patient does not respond to the one or more notifications, use the one or more wearable devices, or activate the application. The patient will likely be contacted if after a predetermined time the patient has not enabled the application. After the patient and health care provider will resolve any issues on why the patient did not use the application. The patient will then couple the one or more wearable devices to the musculoskeletal system and enable the application in step 104. In a step 106, the patient software is engaged and the surgeon, doctor, or healthcare provider receives a notification. In one embodiment, the patient software being engaged relates to the patient reviewing and responding to notifications or surveys provided by the application. In one embodiment, the patient software being engaged relates to the application being enabled and in communication with the one or more wearable devices.

In a step 108, daily updates are collected for review by the surgeon, doctor, or healthcare provider from the application being used. The daily updates can include patient responses to questions or surveys or measurement data from the one or more wearable devices. The application provides predetermined movements or exercises that are measured by the one or more wearable devices. The application will provide video, audible, or haptic support on how to do the predetermined movements or exercises. In a step 116, the surgeon, doctor, or healthcare provider sends automated notes to the patient if the patient stays within "preset" parameters on progress directed by the application.

For example, the patient has under gone knee replacement surgery. The application tells the patient to try to move the leg 90 degrees with the one or more wearable devices enabled. The application will send an automated note to the patient if the 90 degree leg bend has been achieved. The application is configured to measure the movement of the leg and report the measurement data. The application can also have other movements with predetermined parameters that are measured by the one or more wearable devices. The patient achieving the goals set by the application would then be given new goals that support further rehabilitation. The surgeon, doctor, or healthcare provider is given the measurement data achieved by the patient. Thus, the surgeon, doctor, or healthcare provider is made aware of the progress but being involved in the day to day rehabilitation process is not required as long as the patient is progressing.

In a step 110, the surgeon, doctor, or healthcare provider sends a note to the patient and revises post-operative protocol. For example, the patient may not be meeting the preset parameters within the application and is not progressing. The application notifies the surgeon, doctor, or healthcare provider if sufficient progress is not made over a predetermined period of time. The surgeon, doctor, or healthcare provider responds to the patient not meeting the goals supported by the application and revises the post-operative protocol. This can involve increasing their physical therapy or changing the amount of pain medications they require.

In a step 112, compliance is defined and monitored. For example, is the patient putting the one or more wearable devices on correctly or are they using them in conjunction to the application correctly. Compliance is a check on the patient usage of the application and the one or more wearable devices. In a step 118, the patient is not in compliance. The surgeon, doctor, or healthcare provider re-engages the patient on the importance of using the application and the one or more wearable devices for rehabilitation of the musculoskeletal system. Re-engagement can include providing a video to the patient to illustrate the use of the application and the one or more wearable devices. Alternatively, re-engagement can include having the patient working with a therapist until they can be in compliance with using the application and the one or more wearable devices.

In a step 114, the patient is in compliance and automated progress is sent with updates. Measurement data from the one or more wearable devices is reviewed and the progress made performing the exercises or movements in the application. The exercise and movement goals are increased based on the time after surgery of the patient. In a step 120, the application reports measurement data and interaction with the patient on a daily basis to determine patient status and progress. Examples of the information received through the application are patient reported outcome measures (PROMS), pain scales or scores, gait analysis, range of motion analysis, ambulatory use, or physical therapy visits. Thus, the application supports daily monitoring of the patient in conjunction with subjective information and measurement data to provide care in the shortest amount of time as needed. In the example, the patient is comforted in the fact that the surgeon, doctor, or healthcare provider is supporting their recovery through communication via the application.

In a step 122, the patient is engaged weekly with PROMS and activity checks. Typically, the patient does not require daily monitoring after the first six weeks of rehabilitation using the application. The application changes to a weekly engagement if the patient has been meeting the goals defined by the application and performed by the patient. The application is configured to set goals for the patient and encourage the patient as the goals are met. The goals are increased until the patient rehabilitation is completed. Note that the surgeon, doctor, or healthcare provider requires little interaction unless the subjective responses or measurement data from the one or more wearable devices warrants a response to the patient. Yet, the surgeon, doctor, or healthcare provider is aware of the progress being made through the application. In one embodiment, the surgeon, doctor, or healthcare provider responds through the application to the patient to make them aware that their progress is being reviewed. In one embodiment, the patient requires less office visits because the measurement data provided through the application along with subjective information can be used in place of a visit. In one embodiment, the patient can interact with the surgeon, doctor, or healthcare provider using a video chat and go over the progress made using the measurement data that the application has recorded thereby reducing office visits. In a step 124, the application will provide yearly status updates. Six months after the surgery, the patient should no longer be required to interact with the surgeon, doctor, or healthcare provider through the application on a weekly basis. A yearly status update will be sufficient. The application will send a patient reported outcome measures. The response of the patient to the PROMS can be sufficient to receive an automated response, a video chat, or a visit to the surgeon, doctor, or healthcare provider to address issues that may have arisen. In one embodiment, the patient can receive a patient reported outcome measures each year for ten years or more thereby providing long-term care or maintenance related to the installed prosthetic component or prosthetic joint. Thus, a pathway of care for the patient of an orthopedic surgery can be provided that provides better care while allowing the surgeon, doctor, or healthcare provider to handle more patients using an application on a computer with one or more wearable devices.

FIG. 6 is a workflow 130 using a one or more implantable devices in accordance with an example embodiment. The workflow 134 corresponds to computer 34 running applications (app) 18, 28, or 32 of FIG. 1. Computer 34 and applications 18, 28, or 32 will be referred to in reference to workflow 130. As previously mentioned computer 34 can be a cell phone, tablet, notebook computer, medical device or other device configured for running the application and supporting video, audible, or haptic interaction with the patient. Workflow 130 is configured to be used with implantable devices such as implantable device 30 of FIG. 1. Implantable device 30 is configured to couple to the musculoskeletal system. In one embodiment, implantable device 30 is placed sub-dermal in the patient body. One or more implantable devices 30 can be used with applications 18, 28, or 32. In one embodiment, one or more implantable devices 30 are implanted in the patient during the installation of a prosthetic component or a prosthetic joint. In the example, one or more prosthetic components or a structure for repairing the musculoskeletal system is adapted for receiving one or more implantable devices 30 as shown in FIGS. 2A-2C, FIGS. 3A-3D, and FIG. 4. In one embodiment, implantable device 30 is used in post-operative pathway of care 14. In the example, implantable device 30 includes at least one sensor configured to measure movement, position, or orientation but can include other sensors to measure one or more parameters. In one embodiment, the at least one sensor is an IMU. In a step 134, one or more implantable devices 30 are coupled to the musculoskeletal system sub-dermal. The application is pre-set with one or more notifications that are enabled when the patient initializes the application for the first time. The patient should respond to the pre-set notifications if required and enable the one or more implantable device 30. In a step 132, the patient applies one or more wearable devices prior to starting the application if the patient does not have implantable devices 30. In one embodiment, the patient will be contacted if after a predetermined time the patient has not enabled the application, implantable device 30, or one or more wearable devices. The patient will enable the application, implantable devices 30, or the one or more wearable devices in step 134 after a health care provider addresses issues that the patient may have. In a step 136, the patient software is engaged and the surgeon, doctor, or healthcare provider receives a notification. In one embodiment, the patient software being engaged relates to the patient reviewing and responding to notifications or surveys provided by the application. In one embodiment, the patient software being engaged relates to the application being enabled and in communication with implantable devices 30 or one or more wearable devices.

In a step 138, daily updates are collected for review by the surgeon, doctor, or healthcare provider from the application being used. The daily updates can include patient responses to questions or surveys or measurement data from implant devices 30 or the one or more wearable devices. The application provides predetermined movements or exercises that are measured by the implantable devices 30 or one or more wearable devices. The application will provide video, audible, or haptic support on how to do the predetermined movements or exercises. In a step 146, the surgeon, doctor, or healthcare provider sends automated notes to the patient if the patient stays within "preset" parameters on progress directed by the application. For example, the patient has under gone knee replacement surgery. The application tells the patient to try to move the leg 90 degrees with the implantable devices 30 enabled. The application will send an automated note to the patient if the 90 degree leg bend has been achieved. The application is configured to measure the range of motion of the movement of the leg and report the measurement data. The application can also have other movements or exercises with predetermined parameters that are measured by the implantable devices 30. The patient achieving the goals set by the application would then be given new goals that support further rehabilitation. The surgeon, doctor, or healthcare provider is given the measurement data achieved by the patient. Thus, the surgeon, doctor, or healthcare provider is made aware of the progress but being involved in the day to day rehabilitation process is not required as long as the patient is progressing.

In a step 140, the surgeon, doctor, or healthcare provider sends a note to the patient and revises post-operative protocol. For example, the patient may not be meeting the preset parameters within the application or is not progressing at an acceptable rate. The application notifies the surgeon, doctor, or healthcare provider the progress made over a predetermined period of time. The application encourages patients who meet the pre-set parameters or goals. The surgeon, doctor, or healthcare provider responds to the patient not meeting the goals supported by the application and revises the post-operative protocol. This can involve increasing their physical therapy or changing the amount of pain medications they require.

In a step 142, compliance is defined and monitored. For example, the patient is in compliance by using the application correctly with implantable devices 30 to perform exercises or movement goals within a predetermined time line. Compliance is a check on the patient usage of the application and the implantable devices 30 or the one or more wearable devices. In a step 148, the patient is not in compliance. The surgeon, doctor, or healthcare provider re-engages the patient on the importance of using the application and the implantable device 30 or the one or more wearable devices for rehabilitation of the musculoskeletal system. Re-engagement can include providing a video to the patient to illustrate the use of the application and the implantable devices 30 or the one or more wearable devices. Alternatively, re-engagement can include having the patient working with a therapist until they can be in compliance with using the application and the implantable devices 30 or the one or more wearable devices.

In a step 144, the patient is in compliance and automated progress is sent with updates. The patient continues to use the application to perform and measure exercises or movements such that each goal is encouraged or celebrated. The automated process of the application sets new goals towards achieving full rehabilitation. Measurement data from implantable devices 30 or the one or more wearable devices is sent to the surgeon, doctor, or healthcare provider. No visits or interaction with the surgeon, doctor, or healthcare provider may be needed if the patient is meeting goals using the application. In one embodiment, the exercise and movement goals are increased based on the time after surgery of the patient. In a step 150, the patient is monitored on a daily basis for the first six weeks. The application will provide measurement data related to implantable devices 30 or one or more wearable devices through movement or exercises. As previously mentioned, the application teaches or shows how to perform the movements or exercises on the computer and includes video, audible, or haptic feedback showing the patient movement or exercises in real-time as tracked by implantable devices 30 or the one or more wearable devices. The application reports measurement data and interaction with the patient on a daily basis to determine patient status and progress. Examples of the information received through the application are patient reported outcome measures (PROMS), pain scales or scores, gait analysis, range of motion analysis, ambulatory use, or physical therapy visits. In one embodiment, the patient is required to answer surveys related to PROMS, pain scores. Questions asked by the patient can be responded to by the application from a knowledge base. Alternatively, questions can be responded to by the surgeon, doctor, or healthcare provider. Thus, the application supports daily monitoring of the patient in conjunction with subjective information and measurement data to provide care in the shortest amount of time as needed. In the example, the patient feels the surgeon, doctor, or healthcare provider is supporting their recovery. Moreover, the surgeon, doctor, or healthcare provider configures the application to the needs of the patient or based on how the patient is responding to the rehabilitation process measured by the application. Thus, the pre-set parameters of the application versus time may be adjusted to modify the program based on patient performance.

In a step 152, the patient is engaged weekly with PROMS and activity checks. Typically, the patient does not require daily monitoring after the first six weeks of rehabilitation using the application and the implantable devices 30 or one or more wearable devices. The application changes to a weekly engagement if the patient has been meeting the goals defined by the application and performed by the patient. The application is configured to set goals for the patient and encourage the patient as the goals are met. The goals are increased until the patient rehabilitation is completed. Note that the surgeon, doctor, or healthcare provider requires little interaction unless the subjective responses or measurement data from implantable devices 30 or the one or more wearable devices warrants a response to the patient. Yet, the surgeon, doctor, or healthcare provider is aware of the progress being made through the application. In one embodiment, the surgeon, doctor, or healthcare provider responds through the application to the patient to make them aware that their progress is being reviewed. In one embodiment, the patient requires less office visits because the measurement data provided through the application along with subjective information can be used in place of a visit. In one embodiment, the patient can interact with the surgeon, doctor, or healthcare provider using a video chat and go over the progress made using the measurement data that the application has recorded thereby reducing office visits. In a step 154, the application will provide yearly status updates. Six months after the surgery, the patient should no longer be required to interact with the surgeon, doctor, or healthcare provider because the rehabilitation is complete. A yearly status update will be sufficient. The application will send a patient reported outcome measures. The response of the patient to the PROMS can be sufficient to receive an automated response, a video chat, or a visit to the surgeon, doctor, or healthcare provider to address issues that may have arisen. In one embodiment, the patient can receive a patient reported outcome measures each year for ten years or more thereby providing long-term care or maintenance related to the installed prosthetic component or prosthetic joint. Thus, a pathway of care for the patient of an orthopedic surgery can be provided that provides better care while allowing the surgeon, doctor, or healthcare provider to handle more patients using the application on a computer with implantable devices 30 or one or more wearable devices.

An end to end pathway of care is disclosed herein below for orthopedic surgery. Components, applications, and blocks related to the pathway of care from FIGS. 1, 2A, 2B, 2C, 3A, 3B, 3C, 3D, 4, 5, and 6 may be called out by their number from the figures. A workflow 1 is disclosed having a pre-operative pathway of care 10, an intra-operative pathway of care 12, and a post-operative pathway of care 14 for supporting a patient through a surgery for the repair of the musculoskeletal system or the installation of a prosthetic component or a prosthetic joint. Pre-operative pathway of care 12 uses a computer 34, an application 18 for pre-operative use, and one or more wearable devices 16 to support the patient prior to surgery. Computer 34 is configured to run at least one application 18 but can run more than one application for pre-operative pathway of care 10. The one or more pre-operative wearable devices 16 are configured to couple to the musculoskeletal system. For example, if the patient is scheduled to undergo total knee arthroplasty, the patient will couple a first wearable device 16 to a femur of a leg and a second wearable device 16 to the tibia of the leg. In one embodiment, the first wearable device 16 and the second wearable device 16 is configured to couple to the skin or be held in a wrap that places the first wearable device 16 to the femur and the second wearable device 16 to the tibia. Application 18 when enabled on computer 34 is configured to operatively couple to the one or more wearable devices 16 for pre-operative path way of care 10. The one or more wearable devices 16 will each include at least one sensor configured to measure movement, position or orientation. In general, wearable device 16 for pre-operative use will have electronic circuitry, a power source, and the at least one sensor. The electronic circuitry is configured to control a measurement process and transmit measurement data to computer 34. In one embodiment, wearable device 16 includes an inertial measurement unit for measuring movement, position, or orientation. In one embodiment, wearable device 16 can also be used for monitoring the musculoskeletal system in post-operative pathway of care 14. Application 18 will monitor movement of the patient or request the patient to perform specific exercises or movements. Application 18 will collect measurement data from the one or more wearable devices 16 in support of a pre-operative plan for surgical repair of the musculoskeletal system. The surgical repair can also include the installation of a prosthetic component or prosthetic joint.

Workflow 1 is disclosed having a post-operative pathway of care 14 for supporting a patient after surgery for the repair of the musculoskeletal system or the installation of a prosthetic component or a prosthetic joint. Post-operative pathway of care 14 uses a computer 34, applications 28 or 34 for post-operative use, one or more implantable devices 30, or one or more wearable devices to rehabilitate the patient after surgery. In one embodiment, the one or more wearable devices can be wearable devices 16 used in pre-operative pathway of care 10. Computer 34 is configured to run applications 28 and 34 but can run more than one application for post-operative pathway of care 14. Although computer 34 is disclosed as being capable of running applications 28 or 34 for post-operative pathway of care 14, the patient can use any computer configured to run applications 28 and 34 during post-operative pathway of care 14 such as tablets, personal computers, phones, medical devices, or other processor based equipment. The implantable devices 30 or one or more wearable devices are configured to couple to the musculoskeletal system. For example, if the patient is scheduled to undergo total knee arthroplasty, the patient will receive during the knee arthroplasty an implantable device 30 coupled to a femoral prosthetic component of a leg and an implantable device 30 coupled to tibial prosthetic component of the leg. Thus, implantable devices 30 have a predetermined alignment to the femur and the tibia for measuring movement, position, and orientation. Application 28 or 32 when enabled on computer 34 is configured to operatively couple to implantable devices 30 or one or more wearable devices for post-operative path way of care 14. Implantable devices 30 will each include at least one sensor configured to measure movement, position or orientation. In general, implantable devices 30 for post-operative use will have electronic circuitry, a power source, and the at least one sensor. In one embodiment, implantable device 30 are screws configured to screw into a threaded opening of a prosthetic component or orthopedic structure such as a nail or screw for the repair of the musculoskeletal system. In one embodiment, implantable device 30 as a screw can be configured to hold a ligament, tendon, or tissue to the musculoskeletal system. In one embodiment, implantable devices 30 do not have an internal power source but are configured to receive energy from an external source. For example, implantable device 30 can receive electromagnetic, inductive, light, or radio frequency energy or signals that is converted and stored for use to enable the electronic circuitry therein to perform a measurement process. The external power source can be provided continuously to enable implantable device 30 for continuous operation. The electronic circuitry within implantable device 30 is configured to control a measurement process and transmit measurement data to computer 34. In one embodiment, implantable device 30 includes an inertial measurement unit (IMU) for measuring movement, position, or orientation. Applications 28 or 32 will monitor movement of the patient in conjunction with implantable devices 30 or request the patient to perform specific exercises or movements. Application 28 or 32 will collect measurement data from implantable devices 30 or the one or more wearable devices in support of the post-operative plan for rehabilitation of the musculoskeletal system. The surgical repair can also include the installation of a prosthetic component or prosthetic joint. In one embodiment, the measurement data from applications 28 or 32 and implantable devices 30 is used for an automated process for patient monitoring and rehabilitation as part of post-operative pathway of care 14. The automated process improves patient care while reducing a surgeon, doctor, or healthcare time per patient.

In one embodiment, workflow 1 further includes intra-operative pathway of care 12. Intra-operative pathway of care includes using one or more devices having sensors configured to implement a pre-operative plan that can use measurement data received during pre-operative pathway of care 10. In one embodiment, the one or more devices 20, 22, 24, or 26 include sensors configured to measure one or more parameters during the repair of the musculoskeletal system. In one embodiment, the one or more devices 20, 22, 24, or 26 are configured to repair the musculoskeletal system. Measurement data from devices 20, 22, 24, or 26 is used to support the pre-operative plan or make adjustments to the pre-operative plan during surgery in real-time. In one embodiment, the one or more sensors in the one or more devices 20, 22, 24, or 26 are configured to support one or more bone cuts to the musculoskeletal system related to measurement data from the pre-operative wearable devices in the pre-operative plan. In one embodiment, device 20, 22, 24, or 26 respectively correspond to a surgical robot, a surgical tensor, a trialing prosthetic component, or a trialing prosthetic component. As shown, device 24 is a knee trialing prosthetic component and device 26 is a shoulder trialing prosthetic component. Devices 20, 22, 24, or 26 include a sensor configured to measure movement, position, or orientation.

Post-operative applications 28 and 32 are configured to notify a surgeon, doctor, or healthcare provider when the patient has enabled post-operative applications 28 and 32 and implantable devices 30 or the one or more wearable devices. In one embodiment, this occurs the first time the patient uses applications 28 or 32 after the surgery to the musculoskeletal system has been completed. Daily updates are collected for review through applications 28 and 32 and are provided through applications 28 and 32 to the surgeon, doctor, or healthcare provider. Applications 28 and 32 are configured to monitor movement of the patient using implantable devices 30 or one or more wearable devices to determine if pre-set parameters are met. The pre-set parameters can be something as simple a measurement of the amount the musculoskeletal can move (e.g. range of motion) or other more complicated maneuvers. Applications 28 and 32 are configured to monitor compliance to the pre-set parameters using implantable devices 30 or one or more wearable devices. Applications 28 or 32 can report the measurement data from implantable devices 30 or the one or more wearable devices to the surgeon, doctor, or healthcare provider for review. The surgeon, doctor, or healthcare provider can change the pre-set parameters of applications 28 or 32 to support the rehabilitation if the patient is not meeting the pre-set parameters. In general, the pre-set parameters change after the patient has met one or more goals. In one embodiment, the pre-set parameters are based on a timeline for rehabilitation that the surgeon, doctor, or healthcare believe is adequate for the average patient. Applications 28 or 32 will automatically change the pre-set parameters to adjust patient goals if met within the timeline. In one embodiment, applications 18, 28, or 32 are configured to send out automated notes to the patient if the patient has met the pre-set parameters.

The patient is monitored daily for a first predetermined time period after surgery. In one embodiment, the first predetermined time period is six weeks. Applications 28 or 32 is configured to report patient reported outcome measures (PROMS), pain scores, physical therapy visits, surveys requested of the patient, or questions from the patient for review by the surgeon, doctor, or healthcare provider.

The patient is monitored weekly for a second predetermined time period after the first predetermined time period. In one embodiment, the second predetermined time period is six months. Applications 28 or 32 is configured to report PROMS and activity checks during the second predetermined time period. The surgeon, doctor, or healthcare provider can re-engage through applications 28 or 32, or an automated response can be generated by application 28 or application 32. The patient is then monitored yearly for a third predetermined time period after the second predetermined time period. In one embodiment, the third predetermined time period is 10 years. Applications 28 or 32 are configured to receive PROMS from the patient each year. The surgeon, doctor, or healthcare provider can re-engage through applications 28 or 32, or an automated response can be generated by application 28 or application 32. In one embodiment, re-engagement can comprise an interaction through applications 28 or 32, a video conference, or an office visit if measurement data from implantable device 30 indicates an issue.

The surgeon, doctor, or healthcare provider can send a note to the patient through applications 18, 28, or 32 if the patient does not meet the pre-set parameters. The patient compliance to applications 18, 28, or 32 is monitored and can include re-engagement. In one embodiment, the surgeon, doctor, or healthcare provider re-engages with the patient if non-compliant to applications 18, 28, or 32. The patient continues to use applications 18, 28, or 32 to be in compliance. The surgeon, doctor or healthcare provider monitors the patient progress using information provided by applications 18, 28, or 32 to support patient compliance. Applications 18, 28, or 32 sends measurement data from implantable device 30 or wearable device 16 related to activity, gait mechanics, range of motion (ROM), movement, or exercise. The surgeon, doctor, or healthcare provider can adjust the pre-set parameters of applications 18, 28, or 32 based on patient performance.

While the present invention has been described with reference to particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the claims. While the subject matter of the invention is described with specific examples of embodiments, the foregoing drawings and descriptions thereof depict only typical embodiments of the subject matter and are not therefore to be considered to be limiting of its scope, it is evident that many alternatives and variations will be apparent to those skilled in the art. Thus, the description of the invention is merely descriptive in nature and, thus, variations that do not depart from the gist of the invention are intended to be within the scope of the embodiments of the present invention. Such variations are not to be regarded as a departure from the spirit and scope of the present invention.

While the present invention has been described with reference to embodiments, it is to be understood that the invention is not limited to the disclosed embodiments. The scope of the following claims is to be accorded the broadest interpretation so as to encompass all modifications, equivalent structures and functions. For example, if words such as "orthogonal", "perpendicular" are used the intended meaning is "substantially orthogonal" and "substantially perpendicular" respectively. Additionally although specific numbers may be quoted in the claims, it is intended that a number close to the one stated is also within the intended scope, i.e. any stated number (e.g., 90 degrees) should be interpreted to be "about" the value of the stated number (e.g., about 90 degrees).

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

What is claimed is:

1. An orthopedic system comprising:
a processor;
one or more post-operative devices comprising:
  a prosthetic component configured to couple to a tibia of a patient, the prosthetic component including a stem;
  a screw coupled to the stem of the prosthetic component, the screw comprising an internal cavity housing one or more sensors configured to measure movement, the one or more sensors including an inertial measurement unit (IMU),
wherein the processor is configured to:
  operatively couple to the one or more post-operative devices;
  automatically receive measurement data from the one or more-post-operative devices during a predetermined time period; and
  run one or more post-operative applications, wherein the one or more post-operative applications are configured to:
    compare the measurement data from the predetermined time period to one or more predetermined parameters corresponding to the predetermined time period;
    determine a compliance state of the patient based on the comparison; and
    transmit a notification to the patient based on the compliance state.

2. The orthopedic system of claim 1, wherein the one or more post-operative applications are further configured to transmit predetermined notifications when the processor operatively couples to the one or more post-operative devices,
  wherein the one or more post-operative applications are configured to transmit, to a user, a notification corresponding to an initial enablement of the one or more post-operative applications
  wherein the comparing and determining performed by the one or more post-operative applications occurs daily,
  and wherein the one or more post-operative applications automatically adjusts the predetermined parameters based on at least the comparison.

3. The orthopedic system of claim 2 wherein the one or more post-operative applications is enabled during the predetermined time period, wherein the one or more post-operative applications is further configured to request, from the patient, patient reported outcome measures (PROMS), pain scores, therapy visit information, surveys, or questions, wherein the one or more post-operative applications are further configured to transmit measurement data from the one or more post-operative devices related to activity, gait mechanics, range of motion (ROM), movement, or exercise to a remote system, and wherein predetermined parameters of the one or more post-operative applications are configured to be adjustable by the patient.

4. The orthopedic system of claim 1,
wherein the predetermined time period is a first predetermined time period, wherein the one or more predetermined parameters are a first one or more predetermined parameters,
wherein the compliance state is a first compliance state,
wherein the one or more post-operative applications is enabled during a second predetermined time period,
wherein the one or more post-operative applications are further configured to:
compare the measurement data from the second predetermined time period to a second one or more predetermined parameters corresponding to the second predetermined time period, the second one or more predetermined parameters being different than the first predetermined one or more parameters;
determine a second compliance state of the patient based on the comparison;
wherein the second predetermined time period is longer in duration than the first predetermined time period,
wherein the one or more post-operative applications is further configured to request patient reported outcome measures (PROMS) during the second predetermined time period,
wherein the one or more post-operative applications are further configured to send, to a remote system, measurement data from the one or more post-operative devices corresponding to the second predetermined time period.

5. The orthopedic system of claim 4
wherein the one or more post-operative applications is enabled during a third predetermined time period,
wherein the one or more post-operative applications are further configured to:
compare the measurement data from the third predetermined time period to a third one or more predetermined parameters corresponding to the third predetermined time period, the third one or more predetermined parameters being different than the first predetermined one or more parameters and the second one or more predetermined parameters;
determine a third compliance state of the patient based on the comparison;
wherein the third predetermined time period is longer in duration than the second predetermined time period,
wherein the one or more post-operative applications is further configured to request patient reported outcome measures (PROMS) during the third predetermined time period.

6. The orthopedic system of claim 1, wherein the screw is further configured to measure position, or orientation, and wherein the screw is further configured to couple to a threaded opening in the stem.

7. The medical system of claim 1, further including a wearable device configured to measure movement and configured to couple to an exterior portion of the patient,
wherein the processor is further configured to:
communicatively couple to the wearable device; and
receive wearable device measurement data, wherein the measurement data further includes the wearable device measurement data.

8. A medical system comprising:
a prosthetic component configured to couple to a body part of a patient, the prosthetic component including a stem;
a screw coupled to the stem, including at least one sensor disposed within an internal cavity of the screw, the at least one sensor configured to measure movement and generate measurement data; and
a processor configured to:
communicatively couple to the at least one sensor;
run a post-operative application configured to transmit a notification to a user after an initial enablement of the post-operative application;
receive the measurement data from the at least one sensor; and
based on (i) the measurement data, (ii) a predetermined parameter, and (iii) data corresponding to patient usage of the post-operative application, generate a compliance state of the patient corresponding to a predetermined time period.

9. The medical system of claim 8, wherein the processor is further configured to:
generate feedback data based on the compliance state; and
transmit a notification corresponding to the feedback data, wherein the notification is transmitted to at least one of the patient or a user, based on the compliance state.

10. The medical system of claim 9, wherein the post-operative application is further configured to change the predetermined parameter based on the feedback data.

11. The medical system of claim 9, wherein the predetermined time period is a first predetermined time period, wherein the predetermined parameter is a first predetermined parameter, wherein the processor is further configured to:
based on (i) the measurement data, (ii) a second predetermined parameter, and (iii) data corresponding to patient usage of the post-operative application, generate a compliance state of the patient corresponding to a second predetermined time period, the second predetermined time period occurring after the first predetermined time period.

12. The medical system of claim 11, wherein the data corresponding to patient usage of the post-operative application includes one or more patient reported outcome measures (PROMS).

13. The medical system of claim 8, wherein the at least one sensor is further configured to measure position or orientation.

14. The medical system of claim 8, wherein the screw is a first screw, wherein the prosthetic component is a first prosthetic component, wherein the body part is a first body part, further comprising:
a second prosthetic component configured to be coupled to a second body part, the second prosthetic component including a stem; and
a second screw coupled to the stem of the of the second prosthetic component, including at least one sensor disposed within an internal cavity of the second screw, the at least one sensor configured to measure movement.

15. The medical system of claim 14,
wherein the at least one sensor of the first screw is further configured to measure relative movement of the first screw relative to the second screw
wherein the at least one sensor of the second screw is further configured to measure relative movement of the second screw relative to the first screw.

16. The medical system of claim 8, further including a wearable device configured to measure movement and configured to couple to an exterior portion of the patient.

17. The medical system of claim 16, further wherein the processor is further configured to:

communicatively couple to the wearable device; and
receive measurement data from the wearable device.

18. The medical system of claim 17, wherein the wearable device is further configured to measure position or orientation.

19. A medical system comprising:
  a prosthetic component configured to couple to a body part of a patient;
  a screw coupled to the prosthetic component, including at least one sensor disposed within an internal cavity of the screw, the at least one sensor configured to measure movement and generate measurement data;
  a wearable device configured to couple to an exterior portion of the patient, measure movement, and generate movement data; and
  a processor configured to:
    communicatively couple to the wearable device or the at least one sensor;
    run a post-operative application;
    receive measurement data from the wearable device or the at least one sensor; and
    based on (i) the movement data, (ii) a predetermined parameter, and (iii) data corresponding to patient usage of the post-operative application, generate a compliance state of the patient corresponding to a predetermined time period.

20. The medical system of claim 19, wherein the processor is further configured to:
  generate feedback data based on the compliance state; and
  transmit a notification corresponding to the feedback data, wherein the notification is transmitted to at least one of the patient or a user, based on the compliance state.

* * * * *